(12) United States Patent
Dreger et al.

(10) Patent No.: US 9,254,790 B2
(45) Date of Patent: Feb. 9, 2016

(54) BIKE RACK

(75) Inventors: Jason Matthew Dreger, Livonia, MI (US); Gail Rae Matheus, Salem, MI (US); Paul Caruso, Grosse Pointe Park, MI (US); Mitchell Auerbach, Ft. Wayne, IN (US); Maurice R. Fredricks, Grand Haven, MI (US); Todd Ireland, Coopersville, MI (US); Brett Kooistra, Grand Haven, MI (US); Sean Phillips, Huntsville (CA)

(73) Assignee: Cequent Performance Products, Inc., Plymouth, MI (US)

( * ) Notice: Subject to any disclaimer, the term of this patent is extended or adjusted under 35 U.S.C. 154(b) by 406 days.

(21) Appl. No.: 12/828,891

(22) Filed: Jul. 1, 2010

(65) Prior Publication Data

US 2012/0000952 A1    Jan. 5, 2012

(51) Int. Cl.
*B60R 9/00* (2006.01)
*B60R 11/00* (2006.01)
*B60R 9/10* (2006.01)
*B60R 9/06* (2006.01)
*B60R 11/06* (2006.01)
*B60R 9/048* (2006.01)

(52) U.S. Cl.
CPC . *B60R 9/10* (2013.01); *B60R 9/048* (2013.01); *B60R 9/06* (2013.01); *B60R 11/06* (2013.01)

(58) Field of Classification Search
CPC ............ B60R 9/06; B60R 9/10; B60R 11/06; B60R 9/065; B60R 9/08; B60R 9/12; B60R 19/023; B60R 9/048
USPC ......... 224/501, 533, 497, 502, 519, 521, 522, 224/534, 531, 537, 495, 924
See application file for complete search history.

(56) References Cited

U.S. PATENT DOCUMENTS

| 640,736 | A | | 1/1900 | Biester |
| 2,848,253 | A | * | 8/1958 | Walker .......................... 280/513 |
| 3,204,839 | A | | 9/1965 | Yuda et al. |

(Continued)

FOREIGN PATENT DOCUMENTS

| DE | 3900569 | 12/1990 |
| GB | 2182619 | 5/1987 |

(Continued)

OTHER PUBLICATIONS

Machine Translation, Application No. DE3900569, Bicycle holder for cars, Mustapha Gaaloul, Dec. 7, 1990.

*Primary Examiner* — J. Gregory Pickett
*Assistant Examiner* — Lester L Vanterpool
(74) *Attorney, Agent, or Firm* — McDonald Hopkins LLC

(57) ABSTRACT

Apparatus for a bike rack for securing at least one bicycle are described herein. The bike rack is attachable to a vehicle receiver hitch. The bike rack includes a hub assembly, hitch insert assembly, and support wing assembly. The tub assembly includes a pair of hubs each having an arm. The hitch insert assembly includes a first end and a second end. The first end is located within the hub assembly and the second end is engageable with the receiver hitch. The hubs are rotatably adjustable about the first end of the hitch insert assembly. The support wing assembly includes a first wing engageable with the arm of the first hub and a second wing engageable with the arm of the second hub. The bike rack also includes an integral locking member and a pair of independently moveable cradles on each wing. Each cradle includes a bike support member.

25 Claims, 15 Drawing Sheets

(56) References Cited

U.S. PATENT DOCUMENTS

| | | | | |
|---|---|---|---|---|
| 4,830,250 A * | 5/1989 | Newbold et al. | | 224/314 |
| 4,978,133 A * | 12/1990 | Thorne et al. | | 280/484 |
| 5,067,641 A | 11/1991 | Johnson et al. | | |
| 5,096,102 A | 3/1992 | Tolson | | |
| 5,181,822 A | 1/1993 | Allsop et al. | | |
| 5,228,607 A | 7/1993 | Tolsdorf | | |
| 5,373,978 A | 12/1994 | Buttchen et al. | | |
| 5,495,970 A * | 3/1996 | Pedrini | | 224/314 |
| 5,497,927 A | 3/1996 | Peterson | | |
| 5,690,260 A * | 11/1997 | Aikins et al. | | 224/505 |
| 5,820,002 A * | 10/1998 | Allen | | 224/324 |
| 5,820,004 A | 10/1998 | Lane | | |
| D410,891 S | 6/1999 | Adams et al. | | |
| 5,950,892 A | 9/1999 | Tsai | | |
| D415,097 S | 10/1999 | Adams et al. | | |
| 6,006,973 A | 12/1999 | Belinky et al. | | |
| 6,053,336 A * | 4/2000 | Reeves | | 211/20 |
| 6,089,428 A | 7/2000 | Wagner | | |
| 6,099,008 A * | 8/2000 | Caffey | | 280/204 |
| D430,533 S | 9/2000 | Peschmann et al. | | |
| D458,579 S | 6/2002 | Adams et al. | | |
| 6,439,397 B1 * | 8/2002 | Reeves | | 211/17 |
| 6,491,195 B1 | 12/2002 | McLemore et al. | | |
| 6,516,986 B1 * | 2/2003 | Lassanske et al. | | 224/533 |
| 6,523,731 B1 * | 2/2003 | Pedrini | | 224/537 |
| 6,662,983 B2 | 12/2003 | Lane et al. | | |
| 6,695,185 B2 | 2/2004 | Church | | |
| 6,758,380 B1 | 7/2004 | Kolda | | |
| 6,769,704 B2 * | 8/2004 | Cipolla | | 280/163 |
| 6,817,502 B2 * | 11/2004 | Gilstrap | | 224/426 |
| 6,854,630 B2 | 2/2005 | Anderson et al. | | |
| 6,857,545 B2 | 2/2005 | McLemore et al. | | |
| 6,868,998 B2 * | 3/2005 | Dean | | 224/324 |
| 6,951,287 B1 | 10/2005 | Randazzo | | |
| 6,971,565 B2 | 12/2005 | Wang | | |
| 7,000,814 B2 | 2/2006 | Wang | | |
| 7,044,347 B1 * | 5/2006 | Pedrini | | 224/501 |
| 7,213,731 B1 * | 5/2007 | Kolda | | 224/537 |
| 7,240,816 B2 * | 7/2007 | Tsai | | 224/501 |
| 7,290,670 B2 | 11/2007 | Huang | | |
| 7,648,151 B2 * | 1/2010 | Pedrini | | 280/292 |
| D623,117 S | 9/2010 | Farber | | |
| 7,806,307 B2 | 10/2010 | Bergerhoff et al. | | |
| 7,815,083 B2 | 10/2010 | Clausen et al. | | |
| 7,815,084 B2 * | 10/2010 | Allen et al. | | 224/537 |
| D635,087 S | 3/2011 | Flaherty et al. | | |
| 8,028,878 B1 * | 10/2011 | Pedrini | | 224/495 |
| 8,113,398 B2 * | 2/2012 | Sautter et al. | | 224/497 |
| D656,456 S | 3/2012 | Tinstman et al. | | |
| D663,676 S | 7/2012 | Loken et al. | | |
| 8,308,185 B2 * | 11/2012 | Weaver | | 280/506 |
| D672,704 S | 12/2012 | Grago | | |
| 8,444,032 B2 * | 5/2013 | Pedrini | | 224/314 |
| D684,917 S | 6/2013 | Williams | | |
| 2002/0117524 A1 * | 8/2002 | Jeong | | 224/314 |
| 2004/0035898 A1 * | 2/2004 | Gilstrap | | B62J 11/00 224/426 |
| 2004/0256430 A1 | 12/2004 | Wang | | |
| 2005/0061842 A1 * | 3/2005 | Tsai | | B60R 9/06 224/501 |
| 2006/0029483 A1 * | 2/2006 | Allen et al. | | 410/30 |
| 2008/0164292 A1 | 7/2008 | Farney | | |
| 2009/0120984 A1 * | 5/2009 | Sautter et al. | | 224/497 |
| 2009/0266773 A1 | 10/2009 | Janeczko | | |
| 2010/0127479 A1 * | 5/2010 | Weipert et al. | | 280/491.1 |
| 2011/0240700 A1 | 10/2011 | Williams | | |
| 2012/0000952 A1 | 1/2012 | Dreger et al. | | |
| 2012/0027560 A1 | 2/2012 | Olsen | | |

FOREIGN PATENT DOCUMENTS

| | | |
|---|---|---|
| GB | 2235909 | 3/1991 |
| GB | 2363772 | 1/2002 |

* cited by examiner

BIKE RACK

FIELD OF INVENTION

The present invention relates generally to a vehicle accessory mount and, more particularly, to an adjustable bike rack that may be mounted to a vehicle hitch receiver.

BACKGROUND

Bike carriers are typically utilized for storing or transporting bicycles or other cargo items. The bike carriers may be mounted to a vehicle. These vehicle mounted carriers may be positioned at any appropriate location on the vehicle, such as either on the roof of a vehicle or on the rear portion of a vehicle. Often such racks are mounted at the rear of the vehicle where the rack may cause minimum distraction and not obstruct a driver's view. Many vehicles, however, have tailgates that lower and back windows that raise, such as in station wagons, pick-up trucks and many sport utility vehicles, whereby mounting bike racks on the rear of the vehicle becomes inconvenient.

One large class of bike racks includes those racks that may be mounted on the roof of a vehicle. The roof carrier has the advantage of non-obstructed rear vision. However, it has not been widely accepted by the public because of its large size, unsightly appearance and high lift height for loading bicycles. In addition, while this solution may minimize space requirements, as most vehicles roofs are often not utilized for other purposes, loading and unloading the bicycles from a roof rack can be a difficult chore.

Moreover, bicycles that are transported on the vehicle roof may significantly add to the air drag of the vehicle and may therefore reduce gas mileage. In addition, roof mounted racks may be inconvenient since the bicycle rack connections may be located high up on the vehicle, whereby they are difficult to reach. At the very least, the rider is required to lift the bicycle above his head. Even reaching, let alone operating, attachment devices may be difficult at best, and the vehicle's paint job may be damaged.

Another large class of bike racks are those that may be mounted on the vehicle's rear bumper. While these racks are much easier to load and unload, the racks have serious weight restrictions due to the weight limitations of the bumper. The bumper is simply not designed to be a weight bearing fixture. Moreover, these racks tend to have a lack of stability, due in part to the desire to reduce the load on the bumper. The problems multiply if the user increases the number of bikes to be carried.

To engage the bumper, the bicycle carriers may require clamps or brackets that may engage with the upper and lower edges of the vehicle bumper in order to retain the carrier on the bumper. In addition, bumper mounted carriers, if not properly designed or installed, may scratch the bumper surface.

Other types of rear mounted carriers may require the use of straps or complicated assemblies for securing bicycles to the carriers that may be difficult to adjust. The use of the retaining ropes and straps has caused the reliability of the bicycle mountings to depend on some extent on the skill and care of the user.

Another class of bike racks are those that include a rack mounted on a trailer hitch receiver of the vehicle. A common configuration for such hitch receivers is a rectangular receptacle intended for a balled assembly to be inserted and fixed therein. It is upon this balled assembly that a trailer may be hitched. When such a balled assembly is not needed, it may be removed in many designs. When removed, the rectangular receiver is vacant and often covered with a removable cap.

Bicycle racks that may be detachably secured to a conventional trailer hitch mounted on a passenger vehicle may typically employ a rectangular base tube that is received in the trailer hitch square tube hitch receiver mounted on a passenger vehicle. Since the trailer hitch receiver is designed to support large weights, a much more substantial bike rack may be employed.

Traditionally, these bike racks may have static positions that may limit the locations where a bike can be supported by the rack. These limited locations may result in the bike being supported in less than an ideal location or manner. Additionally, it can be difficult to lock the bike(s) to the bike rack with a locking mechanism in order to inhibit theft of the bikes.

Moreover, typical bike racks may utilize two fixed wings or posts. These fixed posts may extend upwardly at an angle relative to one another from a hitch insert. Since the posts are fixed, the angles are also fixed and cannot be changed. Various clamping devices have also been used in the prior art to attempt to secure the crossbar of the bicycles to the bike rack. Such clamping devices have various drawbacks. Some may lack the necessary structural integrity to securely hold bicycles onto the carrier while being transported by the vehicle.

SUMMARY

Apparatus for a bike rack for securing at least one bicycle are described herein. The bike rack may be attachable to a vehicle receiver hitch. The bike rack may include a hub assembly and a support wing assembly. The hub assembly may include a pair of hubs that may each have an arm. The hubs may be rotatably adjustable. The bike rack may include a hitch insert assembly. The hitch insert assembly may include a first end and a second end. The first end may be located within the hub assembly and the second end may be engageable with the receiver hitch. The hubs may be rotatably adjustable about the first end of the hitch insert assembly. The support wing assembly may include a first wing and a second wing. The first wing may be engageable with the arm of the first hub and the second wing may be engageable with the arm of the second hub. The bike rack may also include an integral locking member and a pair of independently moveable cradles on each wing. Each cradle may include a bike support member.

DESCRIPTION OF THE DRAWINGS

Objects and advantages together with the operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

Figure 1:
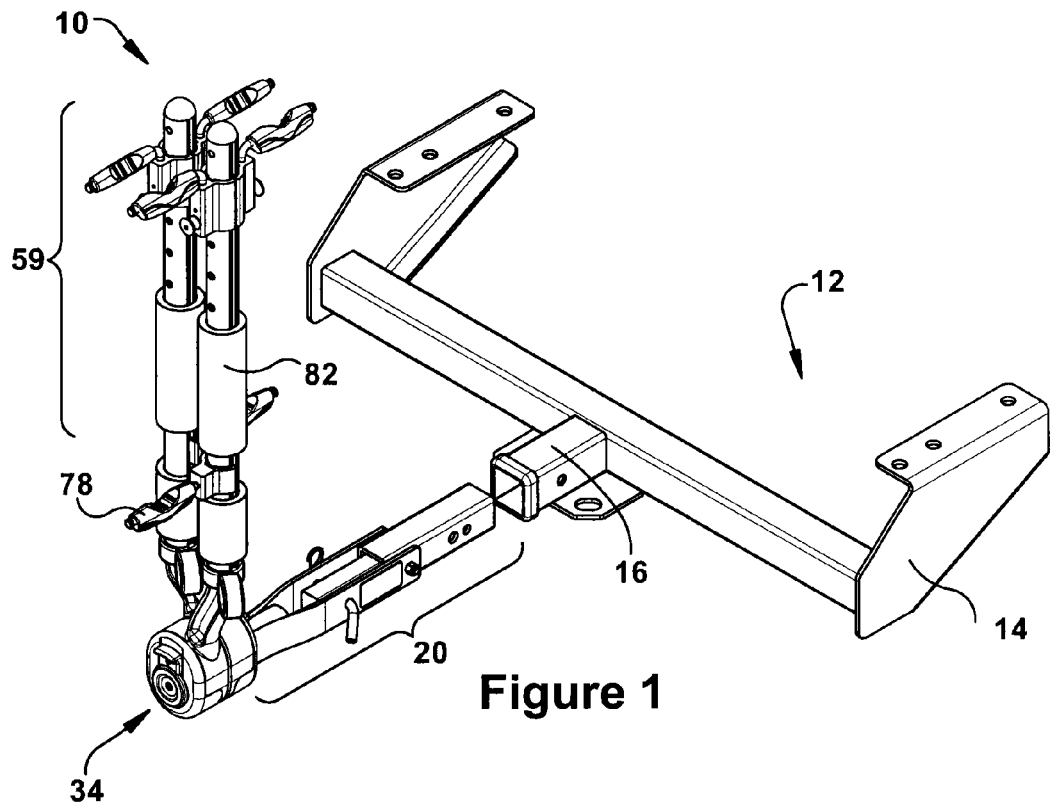
FIG. 1 illustrates a perspective view of a bike rack in use with a receiver hitch assembly of a vehicle.
Figure 2:
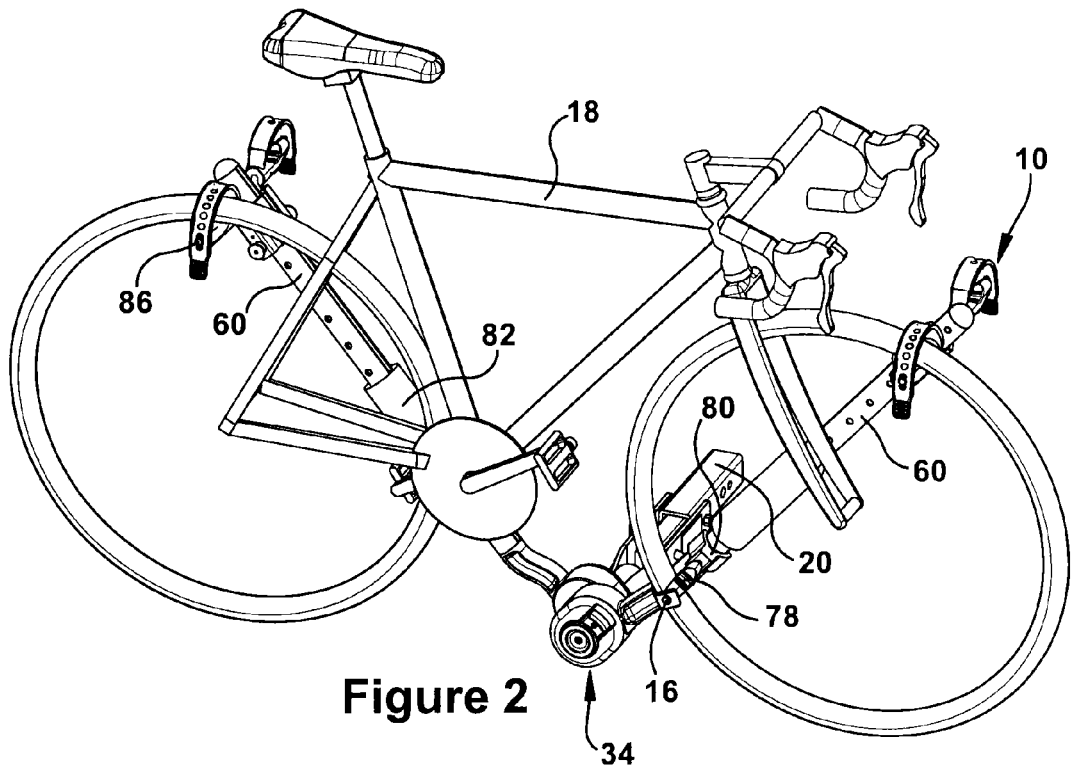
FIG. 2 illustrates a perspective view of the bike rack in use with a bicycle.
Figure 3:
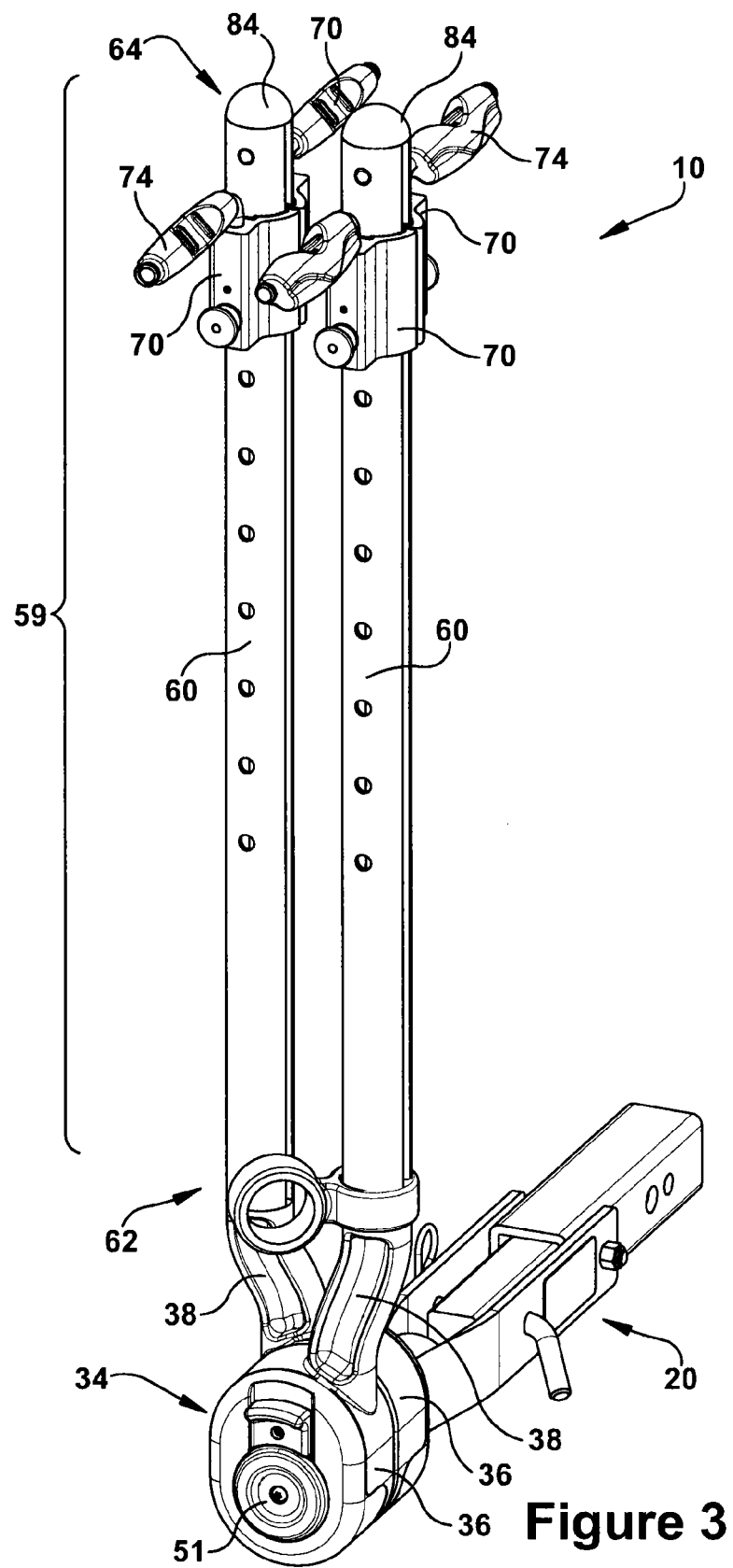
FIG. 3 illustrates a perspective view of the bike rack of FIG. 1.
Figure 12:
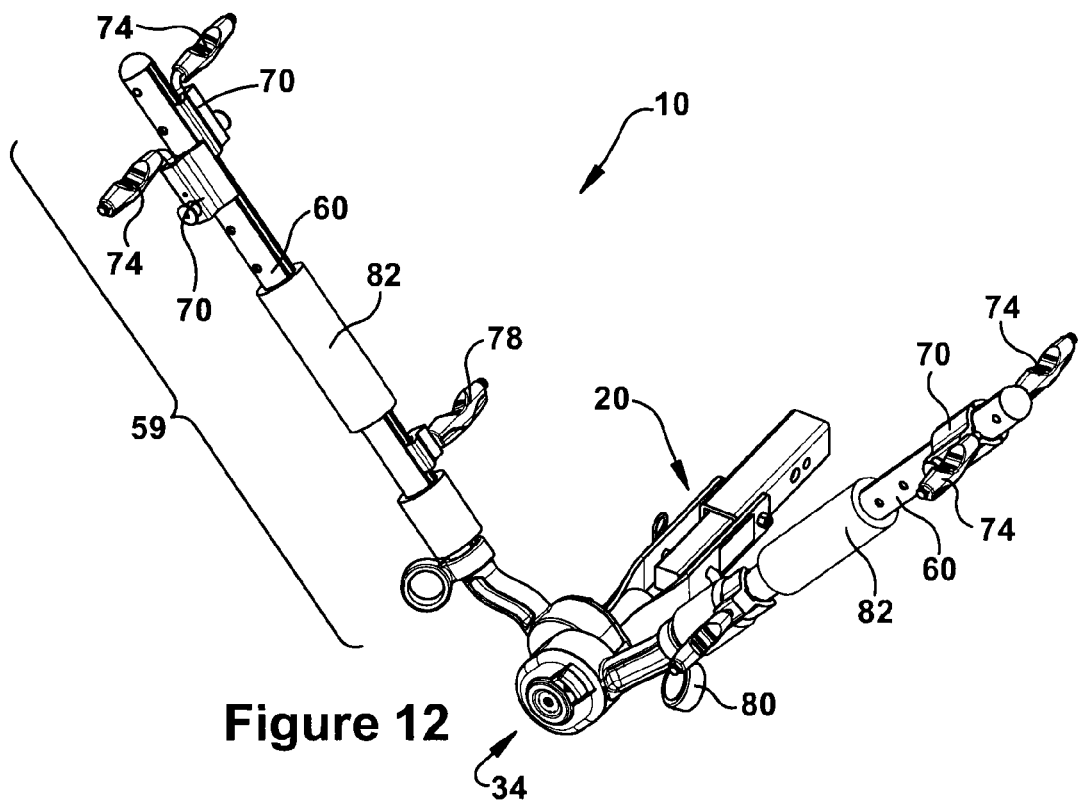
FIG. 12 illustrates a perspective view of the bike rack of FIG. 3 rotated.
Figures 13, 14:
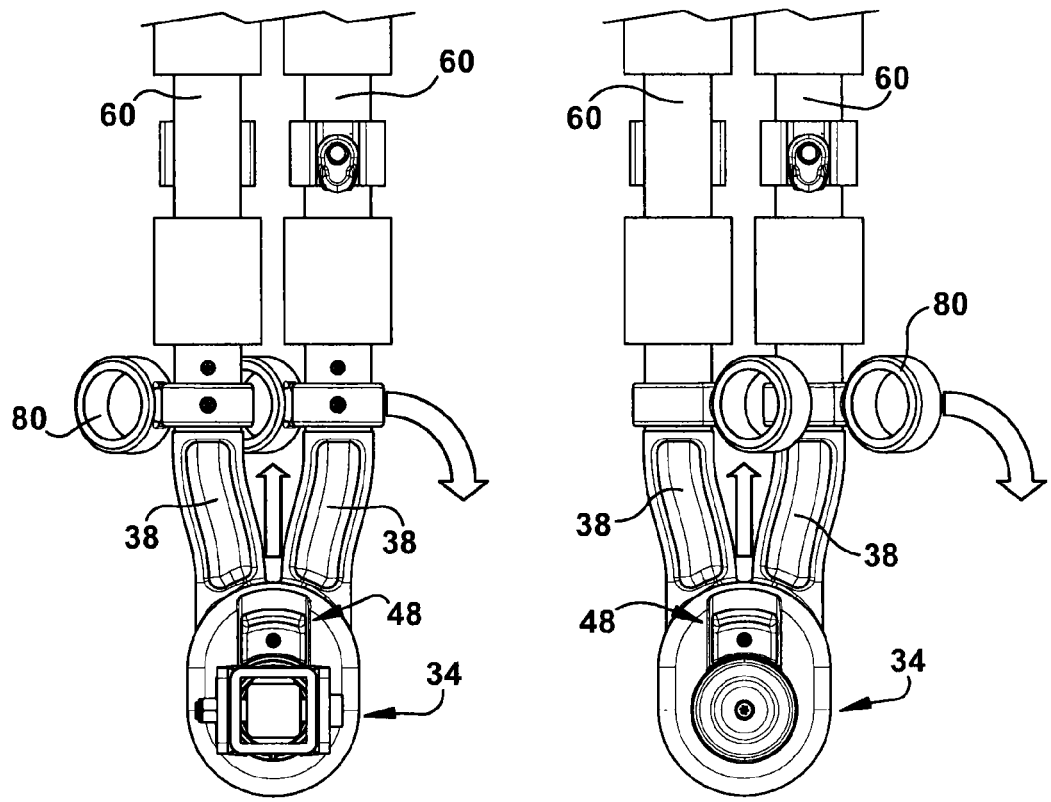
FIG. 13 illustrates a close up rear view of a locking mechanism of the bike rack of FIG. 12.
FIG. 14 illustrates a close up front view of the locking mechanism of the bike rack of FIG. 12.

A bike rack 10 is illustrated in FIGS. 1-3, 12 and 16-19. The bike rack 10 may include a hub assembly 34 and a support tube or wing assembly 59 (FIGS. 1, 3 and 12). The bike rack 10 may be operable to assist in moving or maneuvering cargo, such as bicycles 18. In a non-limiting example, the bike rack 10 may be secured to a vehicle (not shown) that may be equipped with a receiver hitch assembly 12 (FIG. 1). The bike rack 10 may also be operable to store cargo, such as bicycles 18, when the bikes 18 are not being transported. In a non-limiting example, the bike rack 10 may be positioned in any appropriate location, such as on a garage wall or the like. The bike rack 10 may be of any appropriate shape, size, type or configuration.

The receiver hitch assembly 12 may include a hitch frame 14 and a receiver 16 (FIG. 1). The hitch frame 14 may be of any appropriate shape, size, type or configuration. The hitch frame 14 may be secured to the vehicle by any appropriate means, such as welding, fasteners or the like. The receiver 16 may be secured to the hitch frame 14 at any appropriate location, such as at an approximate center of the hitch frame 14. The receiver 16 may be of any appropriate shape or size, such as a generally rectangular tubular shape.

Figure 4:
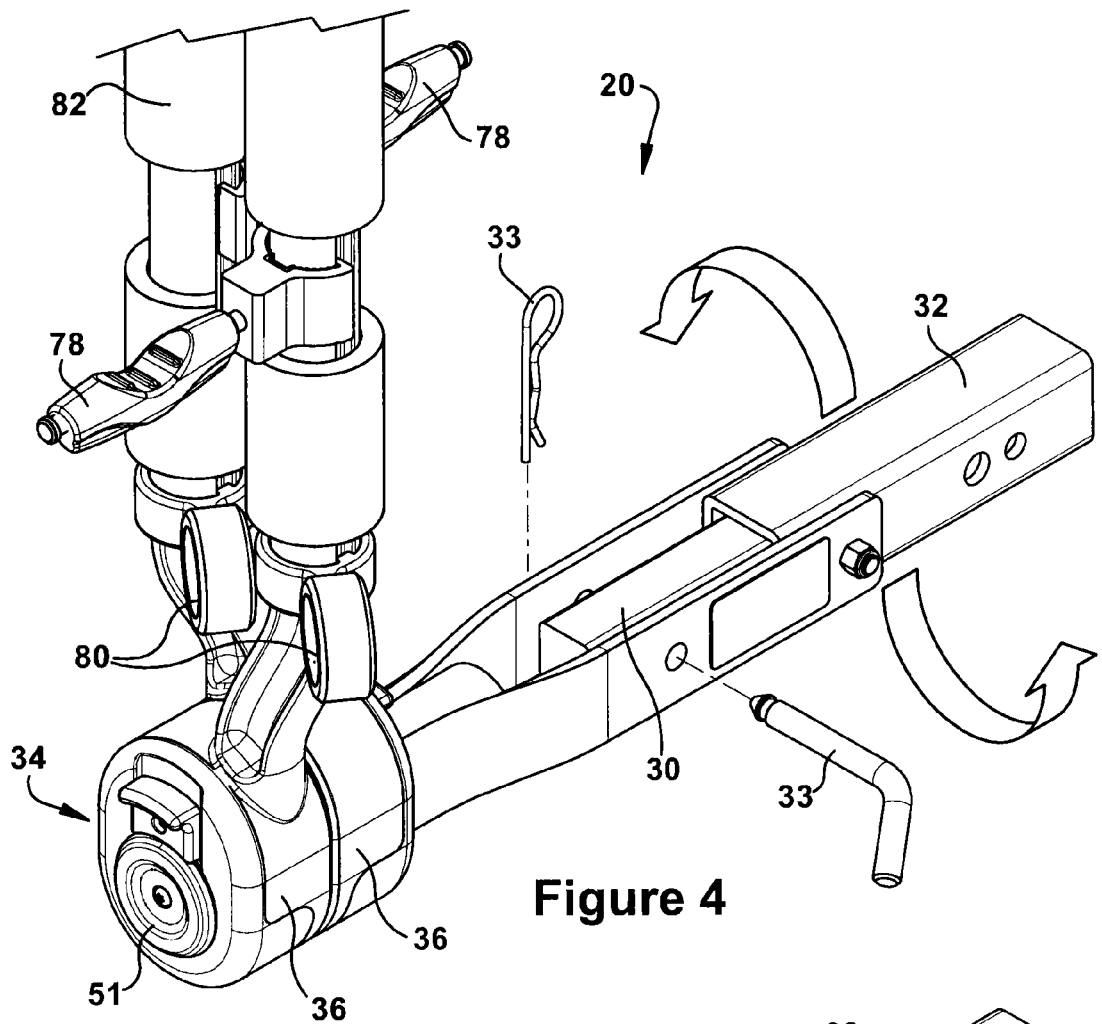
FIG. 4 illustrates a close up perspective view of a hitch insert assembly of the bike rack.
Figure 5:
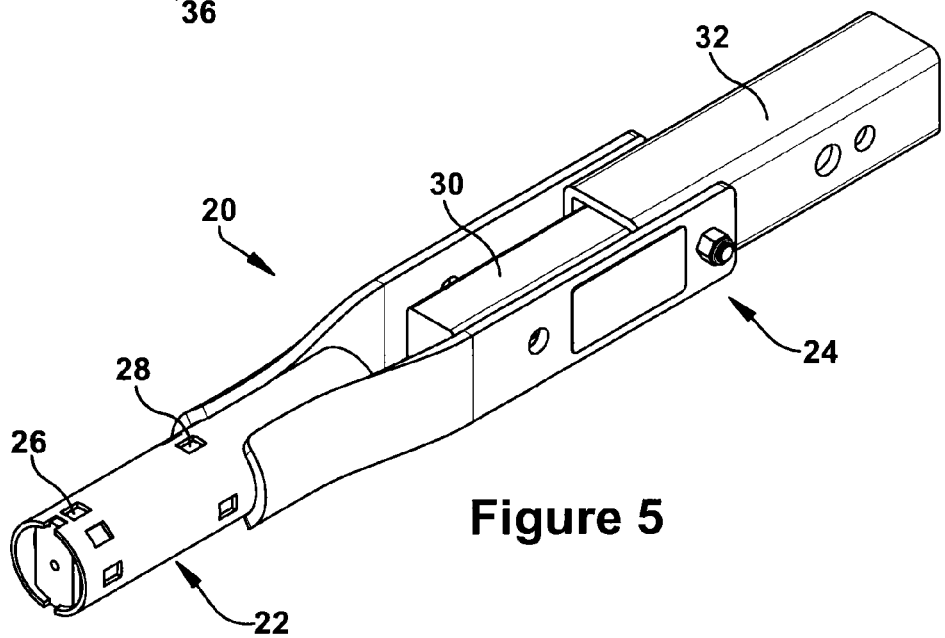
FIG. 5 illustrates a perspective view of the hitch insert assembly of FIG. 4.

The bike rack 10 may also include a hitch insert assembly 20 (FIGS. 1, 3 and 12). In a non-limiting example, the hitch insert assembly 20 may work in conjunction with a receiver hitch assembly 12 to secure the bike rack 10 to a vehicle (FIG. 1). The hitch insert assembly 20 may be of any appropriate shape, size, type or configuration (FIGS. 1-6, 12, 15, 17 and 19). The hitch insert assembly 20 may be fabricated out of any appropriate type of material, such as steel or aluminum. The hitch insert assembly 20 may include a first end 22 and a second end 24 (FIG. 5).

The first end 22 may be of any appropriate shape or size, such as of a substantially cylindrical shape (FIG. 5). The first end 22 of the hitch insert assembly 20 may be engaged with the hub assembly 34 (FIGS. 1-4, 6 and 12). The first end 22 may include at least one set of apertures radially located around the first end 22. For example, the first end 22 may include two sets of apertures 26, 28 (FIG. 5). The two sets of apertures 26, 28 may be located at a distance spaced apart from one another. The two sets of apertures 26, 28 may be of similar or different shapes and sizes.

The second end 24 may be of any appropriate shape or size. For example, the second end 24 may include a pair of bifurcated arms 30, 32, whereby the bifurcated arms 30, 32 may be rotatable (FIGS. 4 and 5). The arms 30, 32 may be secured to the second end 24 by any appropriate means, such as with fasteners 33. For example, the arms 30, 32 may be secured to the second end 24 with a pin and a clip (FIG. 4). In some embodiments, the second end 24 may be configured to be received within and secured to the receiver 16, whereby the arms 30, 32 may not be needed.

The arms 30, 32 may be of any appropriate shape or size, such as a generally rectangular tubular shape. For example, the arms 30, 32, may be of a similar shape to that of the desired receiver 16. The bifurcated arms 30, 32 may have differing dimensions to allow the hitch insert assembly 20 to be received within two different sized hitches. For example, the first arm 30 may include an approximately 1¼ inch shank, and the second arm 32 may include an approximately 2 inch shank (FIGS. 4 and 5).

Figure 6:
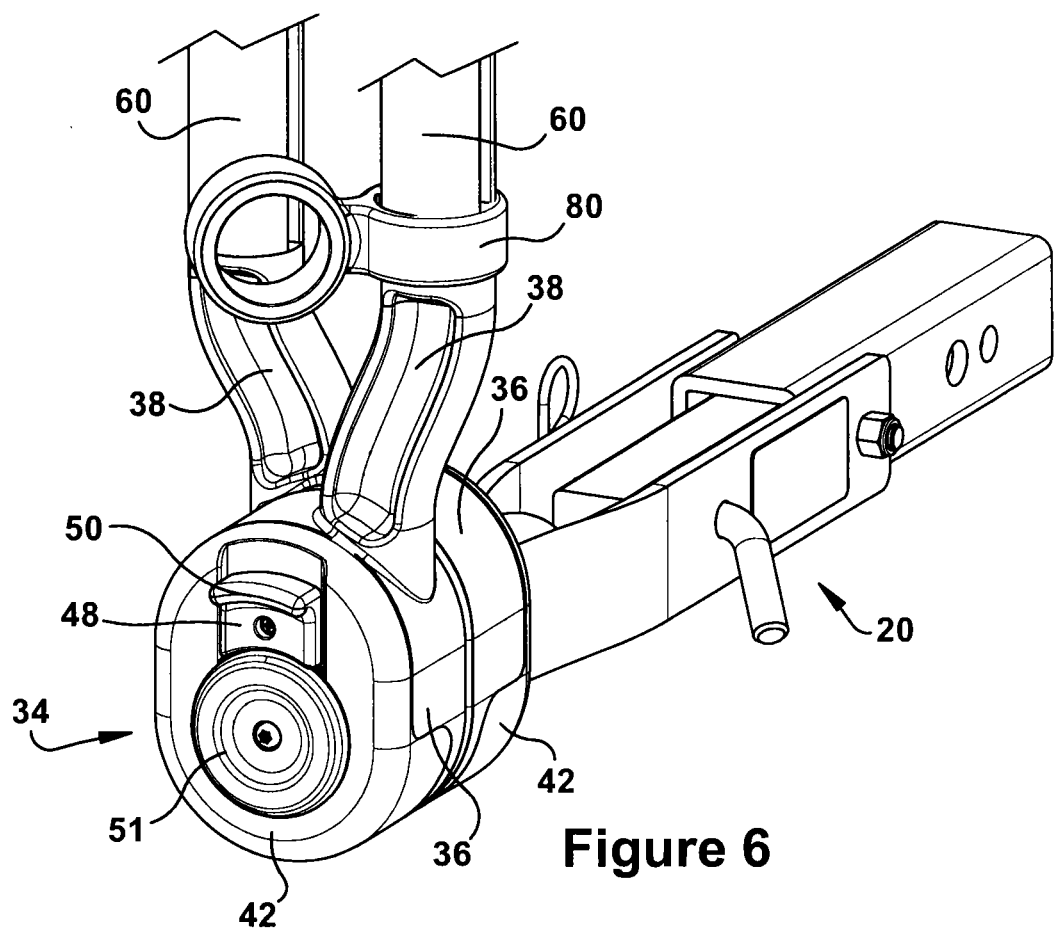
FIG. 6 illustrates a close up perspective view of a hub assembly of the bike rack.

The hub assembly 34 may include a pair of hubs 36 (FIGS. 4 and 6). Each of these hubs 36 may include an arm 38 (FIGS. 4, 6-8 and 15). The hubs 36 may be of any appropriate shape or size, such as a generally rectangular, ovular or cylindrical shape. The hubs 36 may be fabricated out of any appropriate type of material. The hub assembly 34 may be attached to the cylindrical or first end 22 end of the hitch insert assembly 20.

Figure 7:
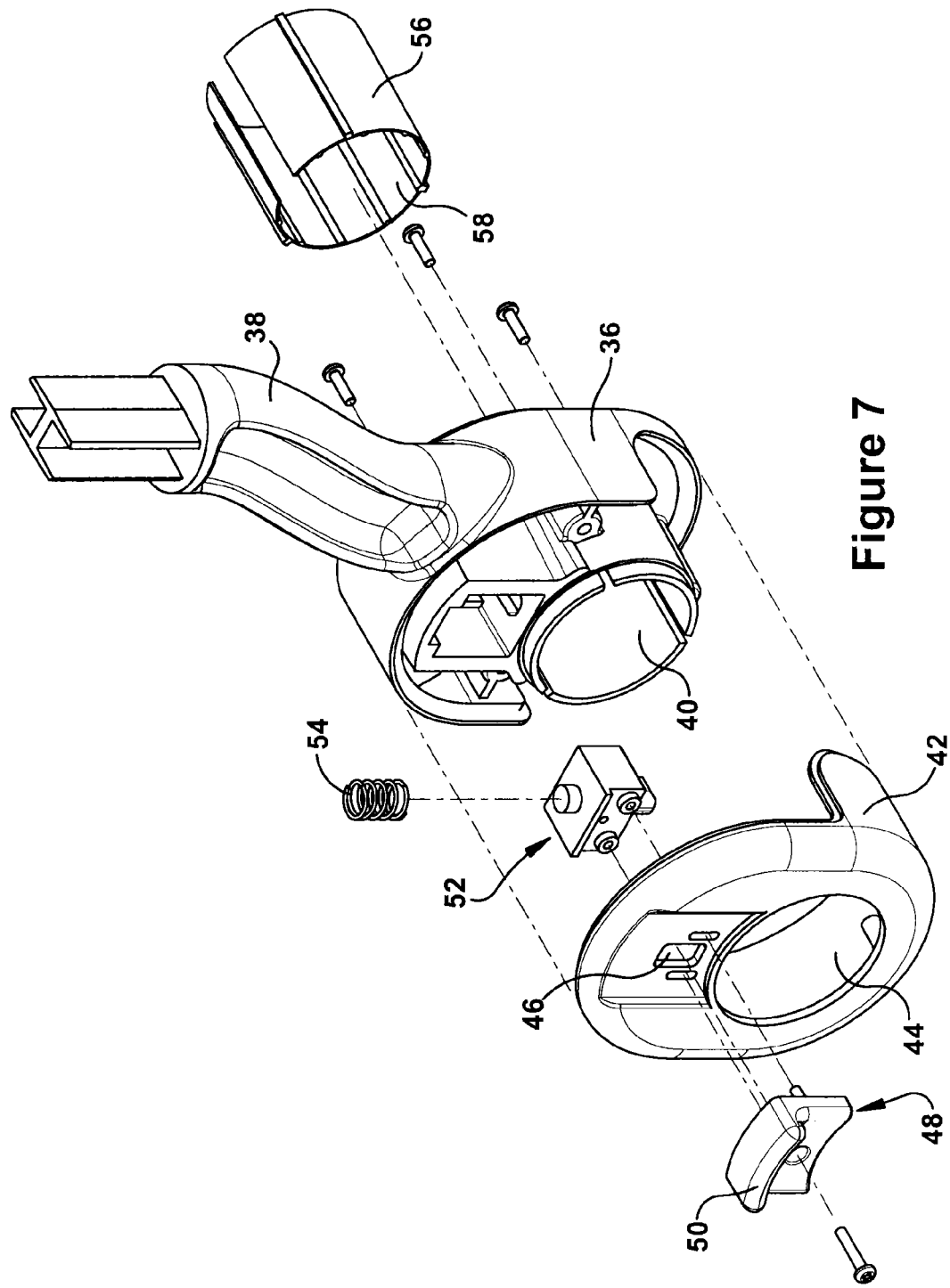
FIG. 7 illustrates a perspective exploded view of a hub of the hub assembly of FIG. 6.

Each hub 36 may include a hub aperture 40 (FIG. 7). The hub aperture 40 may be of any appropriate shape or size, such as a generally cylindrical shape. The hub aperture 40 may be located at any appropriate position on the hub 36, such as at a generally central location through the hub 36 (FIG. 7).

Each hub 36 may include a hub cover 42, a button 48, and a locking mechanism 52, and a sleeve 56 (FIG. 7). The hub cover 42 may be of any appropriate shape or size, such as a generally rectangular, ovular or cylindrical shape. For example, each hub cover 42 may be of a similar shape to that of the hub 36 (FIG. 7). The hub cover 42 may include a hub cover aperture 44 (FIG. 7). The aperture 44 may be of any appropriate shape or size, such as a generally cylindrical shape. The hub cover aperture 44 may be located at any appropriate position on the hub cover 42, such as at a generally central location through the hub cover 42. The hub cover aperture 44 may be aligned with the hub aperture 40 (FIGS. 7 and 8).

The hub cover 42 may also include at least one button aperture 46 (FIG. 7). The button aperture 46 may be of any appropriate shape or size, such as a generally rectangular or circular shape. The button aperture 46 may be located at any appropriate position on the hub cover 42, such as adjacent the hub cover aperture 44 (FIG. 7).

The button 48 may be of any appropriate shape, size, type or configuration, such as of a generally square or rectangular shape (FIG. 7). The button 48 may also include a tab 50 (FIG. 7). The tab 50 may aid in engaging the button 48 and locking mechanism 52. The button 48 may be engaged to operate the locking mechanism 52 (FIGS. 7 and 8).

Figure 8:
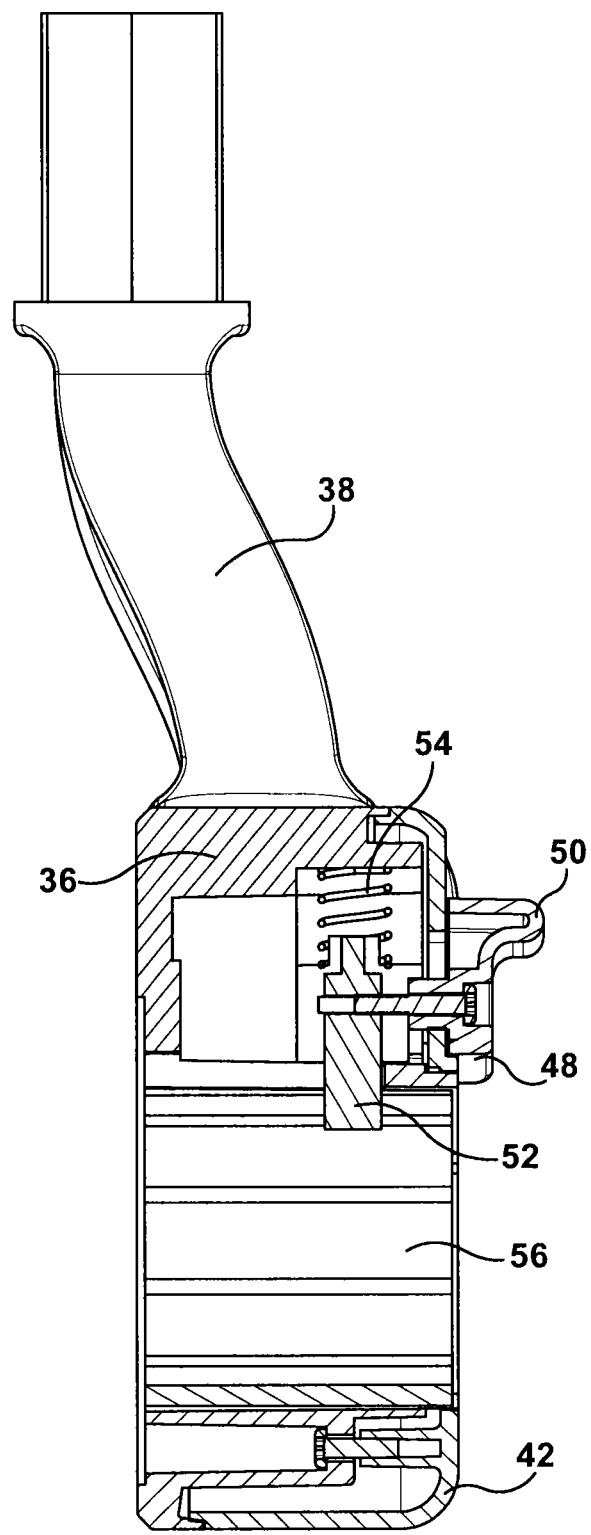
FIG. 8 illustrates a cross-sectional view of the hub of the hub assembly of FIG. 7.

The locking mechanism 52 may be of any appropriate shape, size, type or configuration (FIGS. 7 and 8). The locking mechanism 52 may be located at any appropriate position in the hub assembly 34, such as within the hub 36 (FIG. 8). The locking mechanism 52 may include a projection 53 (FIGS. 7 and 8). The projection 53 may be selectively engaged with the apertures 26, 28 to rotationally lock the associated hub assembly 34 on the first end 22 (FIGS. 5 and 8).

The locking mechanism 52 may be operable within the hub 36 by any appropriate means, such as with a spring 54 (FIGS. 7 and 8). The spring 54 may be of any appropriate shape, size, type or configuration, such as a biasing spring. The locking mechanism 52 may be biased to a locked position by the spring 54. The button 48 may be pushed to unlock the locking mechanism 52, whereby the respective hub 36 may be rotated around the first end 22 of the hitch insert assembly 20 within its respective set of apertures 26, 28.

The sleeve 56 may be of any appropriate shape, size, type or configuration, such as a generally cylindrical shape (FIG. 7). The sleeve 56 may be located at any appropriate position in the hub 36, such as within the hub aperture 40 (FIG. 8). The sleeve 56 may act as a bushing to facilitate rotation within the hub aperture 40. The sleeve 56 may include a sleeve aperture 58 (FIG. 7). The sleeve aperture 58 may be located at any appropriate position on the sleeve 56, such as at a generally central location through the sleeve 56.

The sleeve 56 may also include an axially extending opening 55 (FIG. 7). The opening 55 may be of any appropriate shape or size, such as a partial or complete opening. The opening 55 may be aligned with the projection 53 when assembled. The sleeve 56 may also include at least one rib 57 (FIG. 7). The rib 57 may engage with a complementary feature 41 (FIG. 7). The complementary feature 41 may be located at any appropriate position, such as on the inner surface of the hub 36 whereby the complementary feature 41 may rotationally lock the sleeve 56 to the hub 36.

The sleeve aperture 58 may be aligned with the hub aperture 40 and the hub cover aperture 44 (FIG. 7). The alignment of the hub aperture 40, hub cover aperture 44 and the sleeve aperture 58 may allow the first end 22 of the hitch insert assembly 20 to be located within the hub 36 (FIGS. 4, 6 and 8). The first end 22 of the hitch insert assembly 20 may also include a cover 51 (FIGS. 3, 4 and 6). The cover 51 may be of any appropriate shape or size, such as a generally cylindrical shape.

The hubs 36 may be located at any appropriate position on the bike rack 10, such as being engaged with or located on the first end 22 of the hitch insert assembly 20. For example, a first hub 36 may be engaged with the first set of apertures 26 on the first end 22 of the hitch insert assembly 20, and a second hub 36 may be engaged with the second set of apertures on the first end 22 of the hitch insert assembly 20 (FIGS. 4 and 5).

The support tube or wing assembly 59 may include at least one support tube or wing 60 and at least one cradle 70. The support tube assembly 59, however, may include any appropriate number of wings 60 and cradles 70. For example, the support tube assembly 59 may include a pair of support tubes 60, whereby each support tube 60 may include a pair of cradles 70 (FIGS. 3 and 10-12). The wings 60 may be of any appropriate shape, size, type or configuration. The wings 60 may be fabricated out of any appropriate type of material, such as extruded aluminum. In some embodiments, the wings 60 may be integrally formed with the arms 38 and/or the hub 36.

Each arm 38 may be integrally formed with the hub 36 or may be individual components that may be secured to one another by any appropriate means, such as by fasteners, welding or the like. For example, the arm 38 and the associated hub 36 may be an integrally cast component. The arms 38 may be of any appropriate shape or size, such as a generally rectangular or cylindrical arm having a curvature (FIGS. 6-8 and 15).

Figure 15:
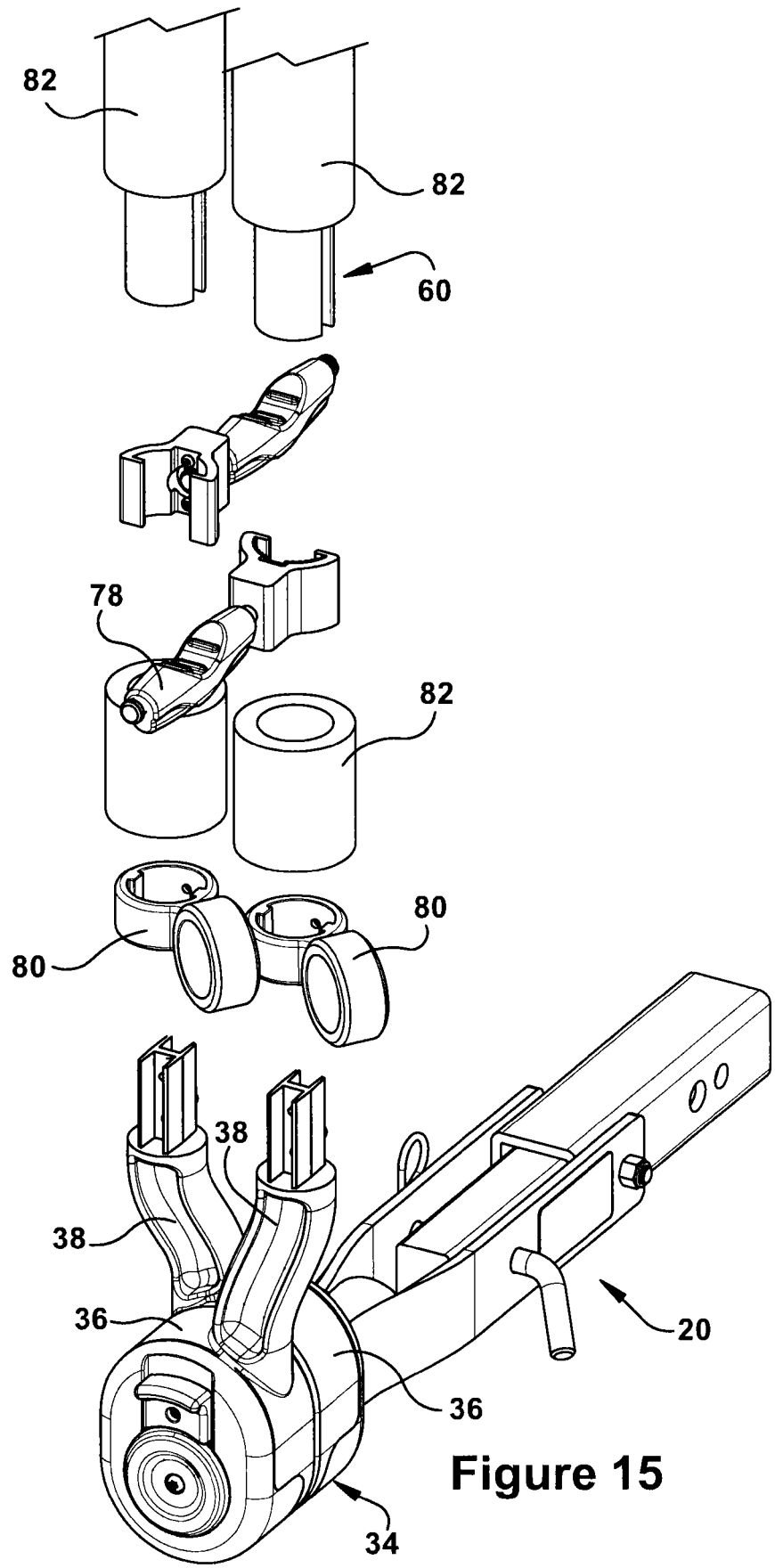
FIG. 15 illustrates a partially exploded close up perspective view of the locking mechanism and anti-sway fingers of the bike rack of FIG. 12.

The arms 38 may be located at any appropriate position on the hub 36, whereby the arms 38 may extend or project outwardly from the hub 36, whereby each wing 60 may be attached thereto (FIGS. 3, 6 and 13-15). The arms 38 may be offset on each hub 36, whereby the wings 60 may not interfere with one another when both wings 60 are in a vertical position (FIG. 3). Each arm 38 may be secured to or engaged with each support tube or wing 60 by any appropriate means. For example, the arms 38 may be inserted into an end of each support tube 60 (FIG. 15).

The hub assembly 34 of the bike rack 10 may allow each wing 60 to independently pivot or rotate between multiple positions to facilitate the supporting of multiple and different types of bikes 18. In one embodiment, each support tube or wing 60 may be pivoted between three discrete positions. In a non-limiting example, each wing 60 may be pivoted between a straight up/vertical position, a straight out/horizontal position, a position located in between the vertical and horizontal positions, and in either direction relative to the vertical position. In some embodiments, each wing 60 may be pivoted about 180 degrees between two opposing horizontal positions. The wings 60 may be pivoted or adjusted independently of one another.

Adjustability of the mounting positions of the bike rack 10 may be accomplished by any appropriate means, such as through the use of the hub assembly 34 and wings 60. In alternative embodiments, the positions may be more numerous and could be infinite depending on the mechanism utilized to hold the wing 60 in position. In addition, the hub assembly 34 and wings 60 may be designed with any desired angles or mounting positions.

In the current embodiment, the first end 22 of the hitch insert assembly 20 may include two sets of locking apertures 26, 28, such as one for each hub 36 and arm 38 attached thereto. The sets of locking apertures 26, 28 may allow a spring biased locking mechanism 52 associated with each hub 36 and thus wing 60 to be moved or adjusted into and out of engagement, thereby allowing the wings 60 and the central hub assembly 36 to be pivoted about the first end 22. When the locking mechanism 52 is released, the locking mechanism 52 may engage with one of the locking apertures 26, 28 when rotated to be aligned therewith. The spring 54 may bias the locking mechanism 52 into engagement.

The wings 60 may attach to the arms 38 on each hub 36 by any appropriate means, such as with fasteners. The wings 60 may be of any appropriate shape or size. For example, the wings 60 may have a hollow cavity to allow the wings 60 to fit over the arms 38. Each wing 60 may include two curved opposite sidewalls 65. The sidewalls 65 may be spaced apart by a groove or channel 66 (FIGS. 10 and 11).

Figure 10:
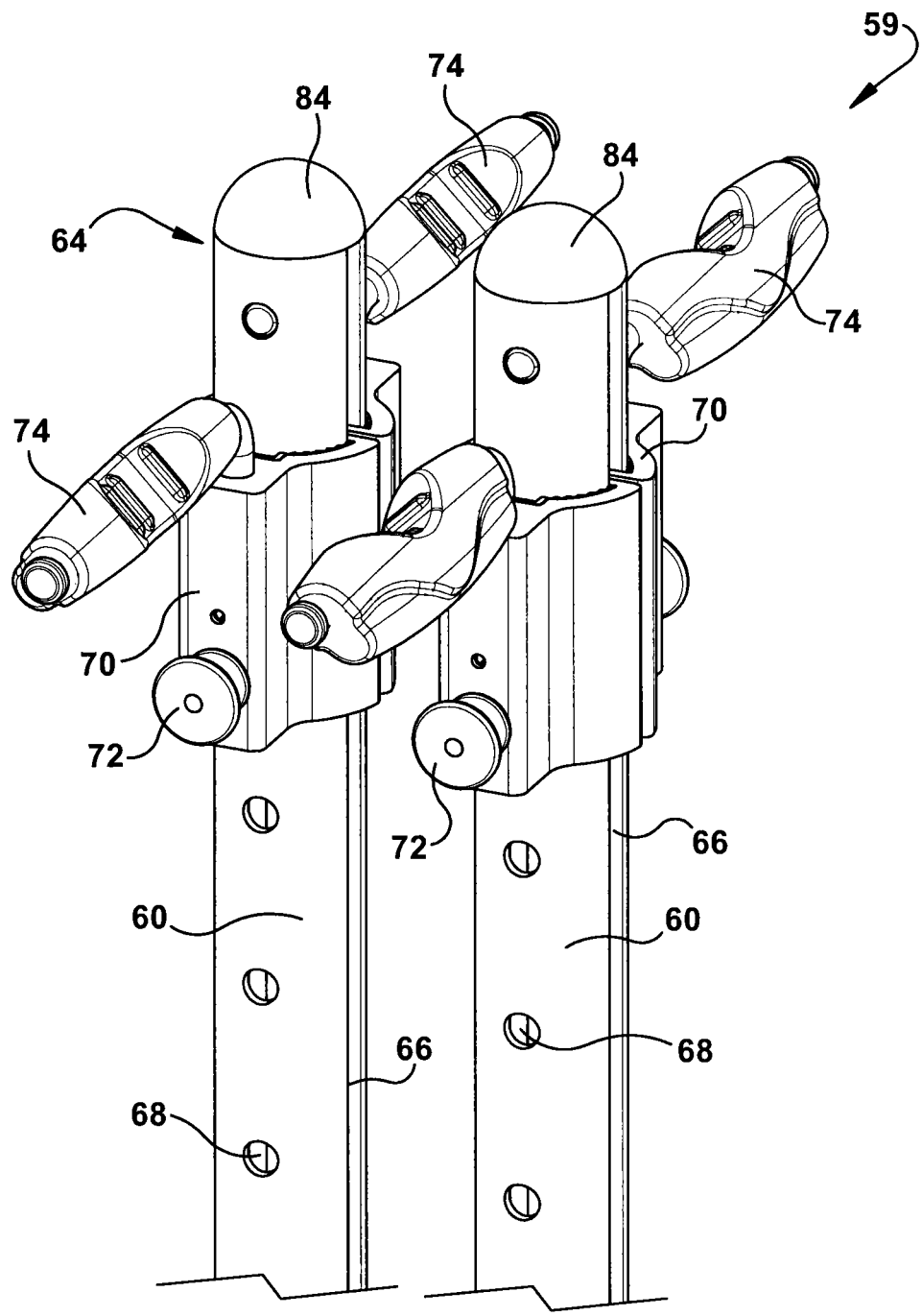
FIG. 10 illustrates a close up perspective view of the support tube assembly of the bike rack of FIG. 3.
Figure 11:
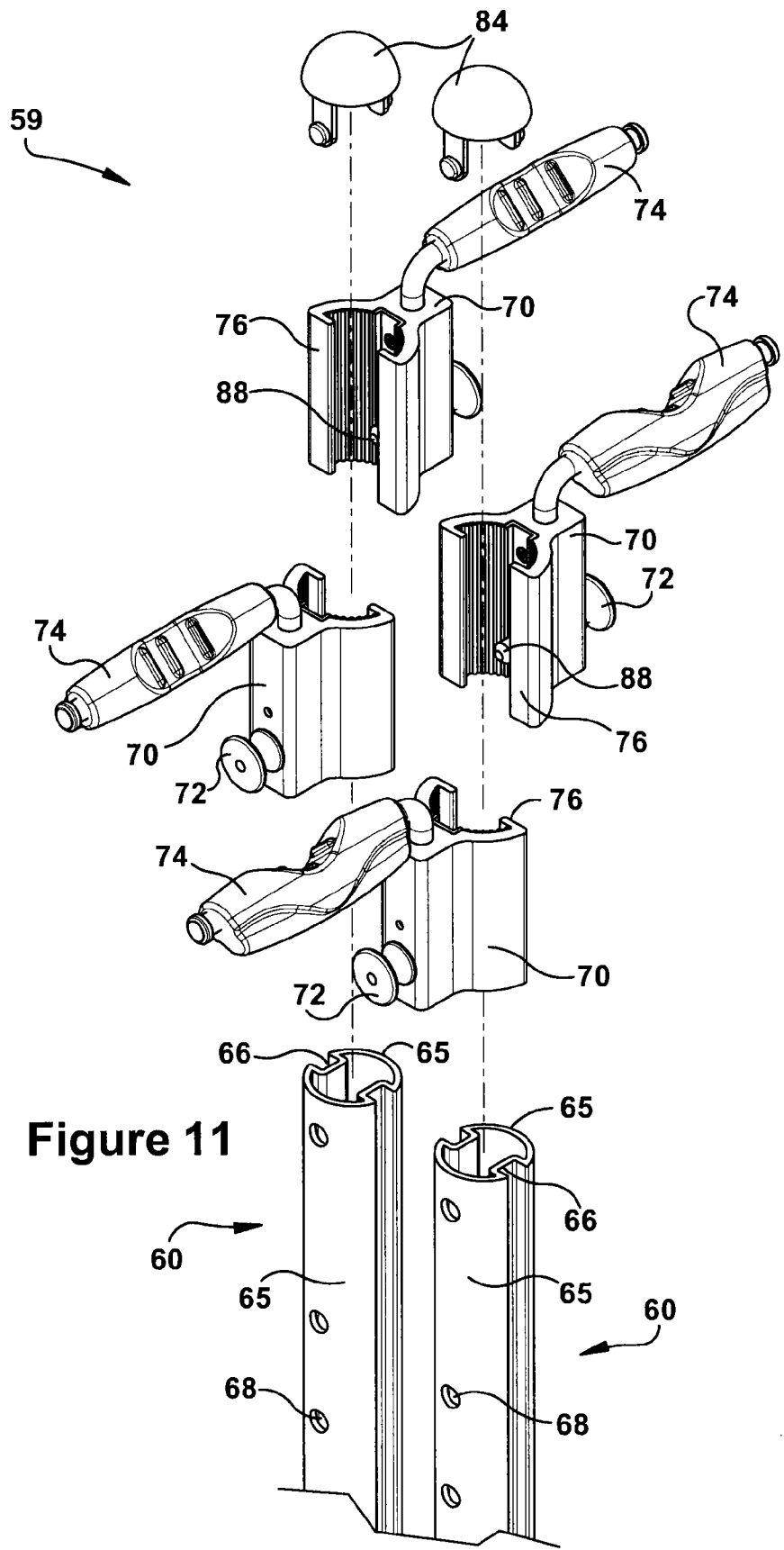
FIG. 11 illustrates a partially exploded close up perspective view of the support tube assembly of FIG. 10.

The channel 66 may be of any appropriate shape or size, such as extending the length of the wing 60, thereby forming opposing "C" shapes when viewed in cross-section (FIGS. 10 and 11). The wings 60 may also include apertures 68. The apertures may be of any appropriate shape or size, such as a generally cylindrical shape. The apertures 68 may be located at any appropriate position on the wings 60 such as at distances spaced apart along the length of each sidewall 65 (FIGS. 10 and 11). Each wing 60 may also include a cap 84. The cap 84 may be of any appropriate shape or size, such as a generally semi-spherical shape. The cap 84 may be located at a second end 64 of the support wing assembly 59, adjacent an end of the wing 60 (FIGS. 3, 10 and 11).

Figure 9:
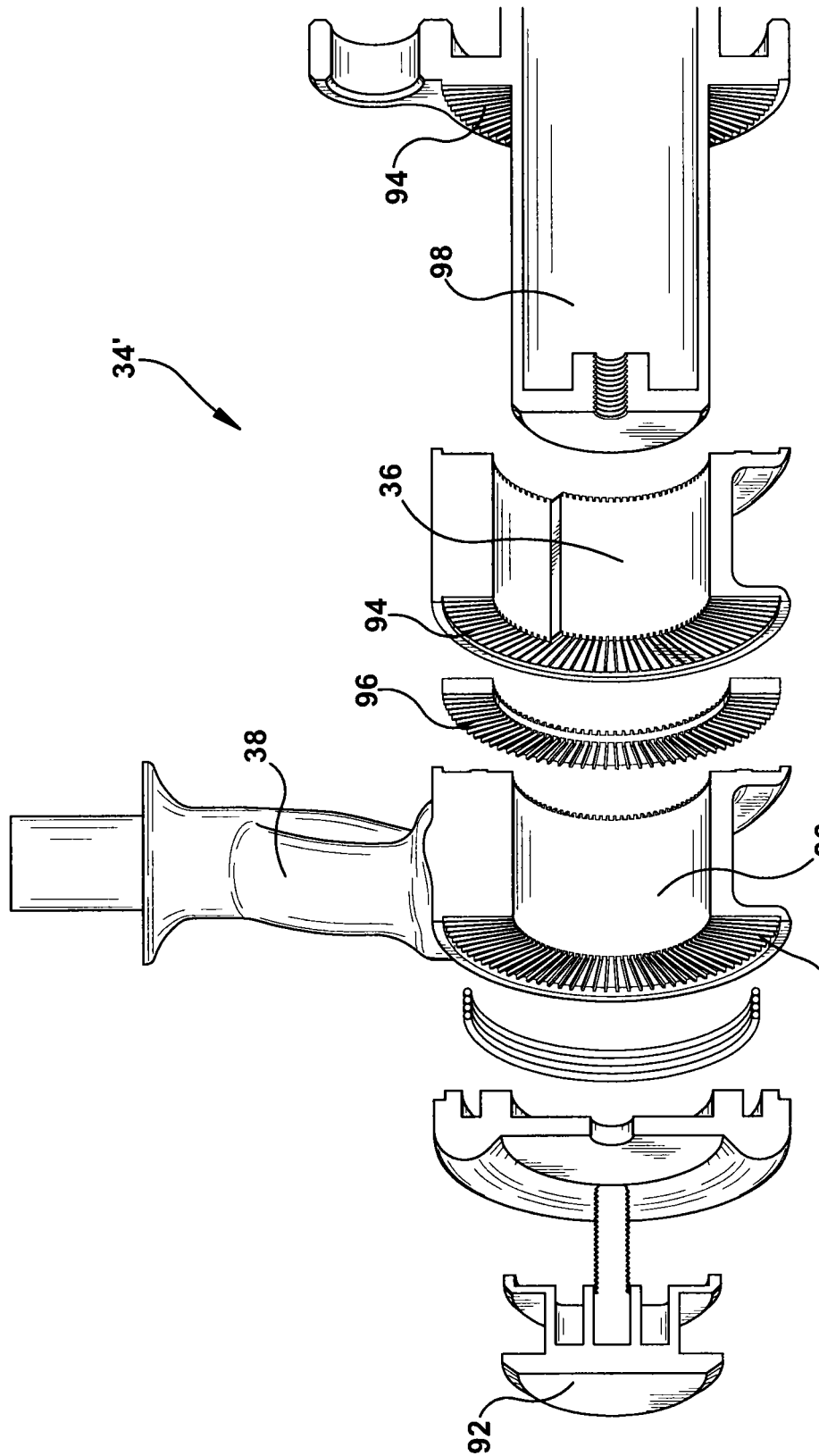
FIG. 9 illustrates a cross-sectional perspective exploded view of an alternative embodiment of a hub of a hub assembly of the bike rack.

As an alternative embodiment, the hub assembly 34' may include several serrated surfaces 94 and different components (FIG. 9). In this embodiment, the hub assembly 34' may include serrated surfaces 94 on each hub 36. In addition, hub assembly 34' may also include a knob 92, a washer 96 and a fixed member 98. The washer 96 may also include serrated surfaces 94 in order to engage with the serrated surfaces 94 of each hub 36. The fixed member 98 may also include a serrated surface 94 to engage with one of the hubs 36. The knob 92 may be pulled on to operate and engage or turn the hub assembly 34' components along the various serrated surfaces 94 to adjust the wings 60 that may be secured to the arms 38. The serrated surfaces 94 may prevent relative rotation when they are engaged, and may allow relative rotation when they are disengaged. Operation of the knob 92 may engage and disengage the serrated surfaces 94, thereby allowing for selective relative rotation.

The cradles 70 may be of any appropriate shape, size, type or configuration. The cradles 70 may be fabricated out of any appropriate type of material, such as aluminum or steel. The cradles 70 may be of any appropriate shape, size, type or configuration. For example, the cradles 70 may be of a generally "C" shape (FIG. 11). The cradles 70 may include at least one slat 76 (FIG. 11). For example, each cradle 70 may include a pair of slats 76. The slats 76 may be of any appropriate shape or size, such as a generally rectangular shape. The slats 76 may be engaged with or located within the groove or channel 66 of the wings 60 (FIG. 11). For example, the "C" shaped end of the cradle 70 may surround one of the sidewalls 65 with the slats 76 engaged in the channels 66 (FIGS. 10 and 11).

Two cradles 70 may be disposed on each wing 60, such as surrounding opposite sidewalls 65 of the wing 60, and may move past one another on the wing 60. Each cradle 70 may include a spring loaded pin 88 and a knob 72 (FIG. 11). The knob 72 may be located at any appropriate position on the cradle 70, such as opposite that of the spring loaded pin 88. The spring loaded pin 88 may engage with apertures 68 in the sidewalls 65 of the wings 60 to retain the cradle 70 and bike support member 74 in a desired location along the length of the wing 60 (FIGS. 10-12). The spring loaded pin 88 may be adjustable by use of pulling on the knob 72, for example.

Figure 21:
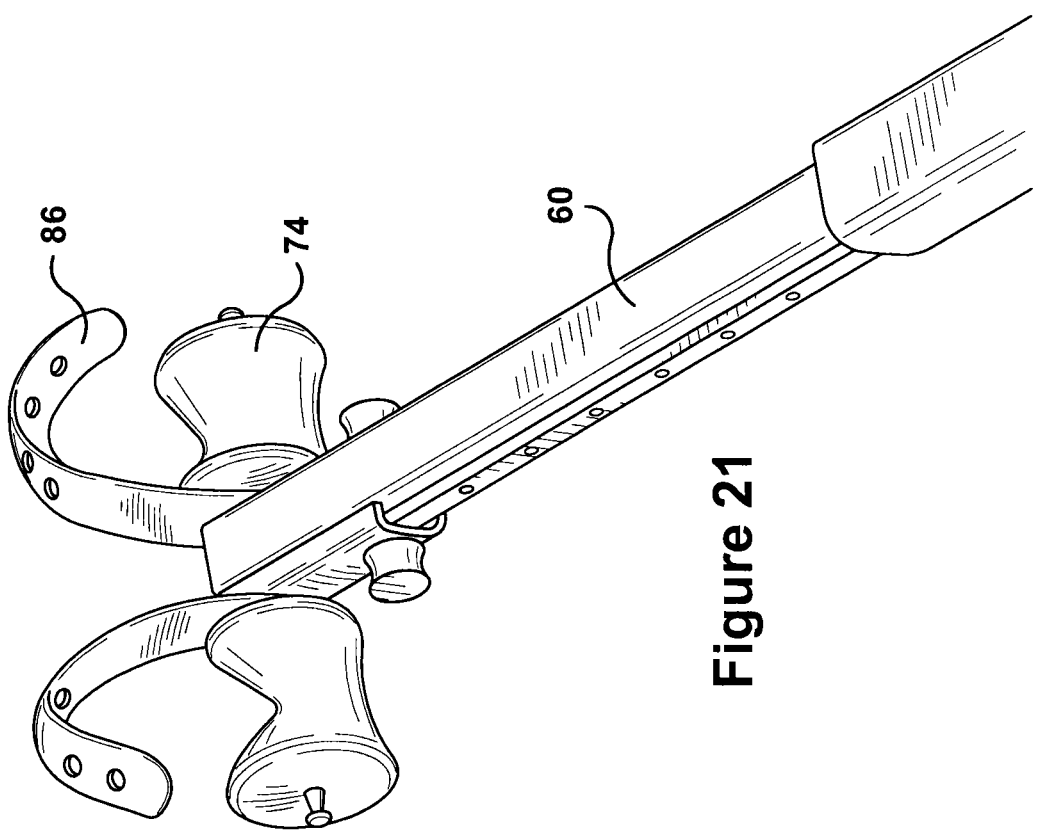
FIG. 21 illustrates a close up perspective view of an alternative embodiment of a support tube assembly for a bike rack.
Figure 20:
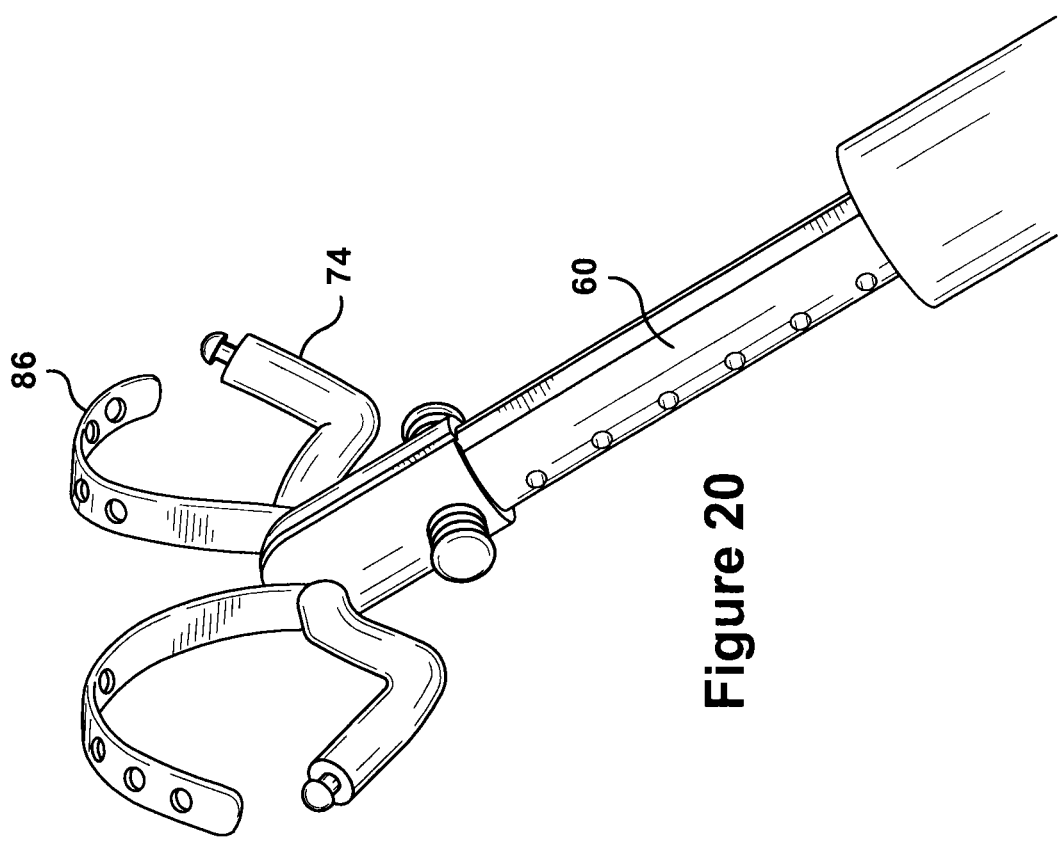
FIG. 20 illustrates a close up perspective view of an alternative embodiment of a support tube assembly for a bike rack.
Figure 22:
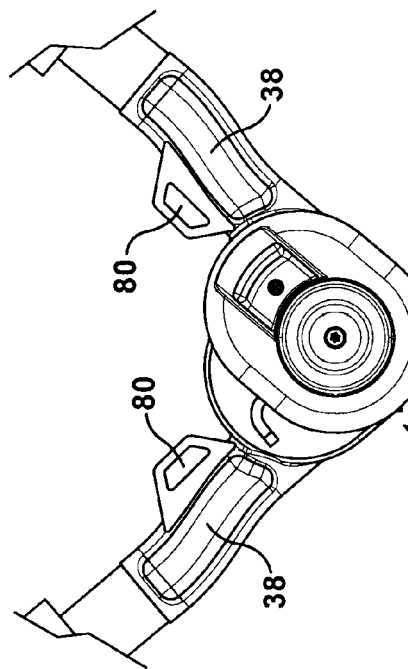
FIG. 22 illustrates a close up perspective view of an alternative embodiment of a locking mechanism for a bike rack.
Figure 23:
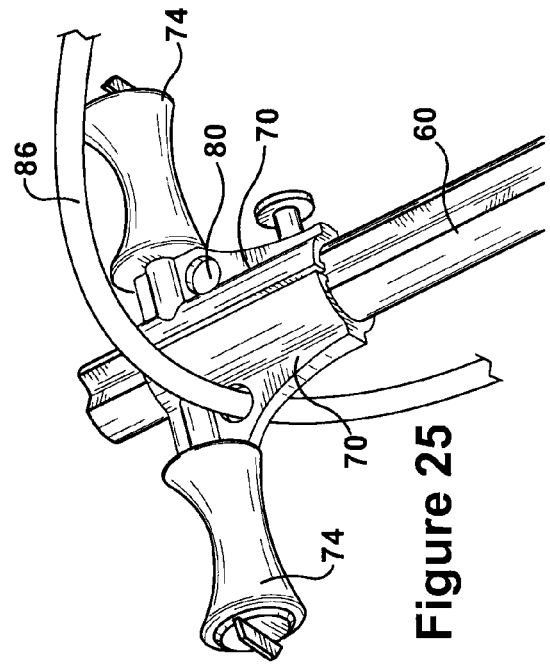
FIG. 23 illustrates a close up perspective view of an alternative embodiment of a locking mechanism for a bike rack.
Figure 24:
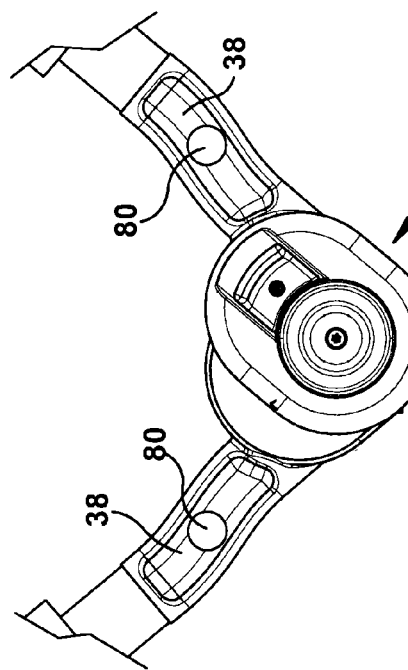
FIG. 24 illustrates a close up perspective view of an alternative embodiment of a locking mechanism for a bike rack.

A bike support members 74 may be attached to each cradle 70 (FIGS. 3 and 10-12). The bike support members 74 may be of any appropriate shape or size to be easily engaged with a bicycle 18. The bike support members 74 may be located at any appropriate position on the cradle 70, such at an uppers location on the cradle 70. The bike support members 74 may include a cable or strap 86 (FIGS. 2, 20 and 21). The cable or strap 86 may be utilized to support the hub of a bike wheel and strap the wheel to the bike support member 74 (FIGS. 2, 20 and 21).

The bike rack 10 may also include an anti-sway finger or cradle 78 (FIGS. 1, 4, 12 and 15). The anti-sway finger 78 may be of any appropriate shape, size, type or configuration. The anti-sway fingers 78 may be a similar shape and size and constructed in a similar manner as the bike support members 74, and may be configured without having the spring loaded pin 88. The anti-sway finger 78 may be located at any appropriate position on the bike rack 10, such as being located on and engaged with the wing 60. The anti-sway fingers 78 may be positioned on the wings 60 closest to the central hub 36 and may be moved along the length of the wing 60 (FIGS. 1, 2, 4, 12 and 15).

Once a bike 18 is supported by the bike support members 74, the anti-sway finger 78 may be moved to a position that may support a lower portion of the bike 18 and the attached strap 86 may be wrapped around a portion of the bike 18 to inhibit the bike 18 from swaying as the vehicle travels. The anti-sway finger 78 may be fabricated out of any appropriate type of material, such as aluminum and steel. The bike support members 74 and anti-sway fingers 78 may be anodized aluminum and may include a protective cover, such as Santoprene®, by way of a non-limiting example.

The bike rack 10 may also include a locking member 80 (FIGS. 4, 6 and 12-15). The locking member 80 may be of any appropriate shape, size, type or configuration. For example, the locking member 80 may be a pair of attached circular members. The locking member 80 may be located at any appropriate position on the bike rack 10, such as adjacent the wings 60. For example, the locking member 80 may be configured to be disposed on the lower portion of the wing 60 which may overlap the arm 38 on the hub 36. For example, the fastener that retains the wing 60 to the arm 38 may also retain the locking member 80. The locking member 80 may provide a secure pass-through opening for a cable 86 to facilitate the locking of the bikes 18 to the rack 10 with a cable 86 (FIG. 2).

Figure 25:
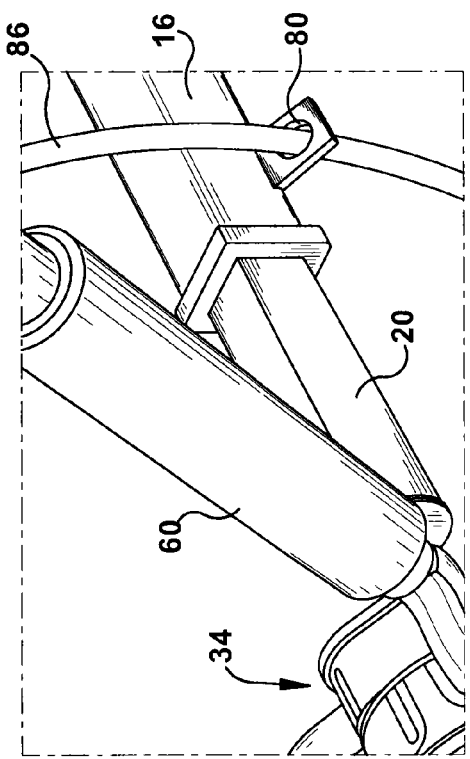
FIG. 25 illustrates a close up perspective view of an alternative embodiment of a locking mechanism for a bike rack.

Various other alternative locking arrangements may be shown in FIGS. 22-26. For example, the locking member 80 may comprise: an aperture located in each arm 38 (FIG. 22); a loop located adjacent each arm 38 (FIG. 23); a loop located adjacent the receiver hitch 16 (FIG. 24); or an aperture located within the cradle 70 (FIG. 25). Additional alternatives may include housing the cable 86 within the wings 60, whereby the cable 86 may lock into the hub assembly 34. When not in use, the cable 86 may slide or retract back into the wings 60. The cable 86 may be housed within the hitch insert assembly 20 and also be able to lock onto the hitch insert assembly, such as through a loop.

The bike rack 10 may include foam protectors 82 (FIGS. 1, 2, 4, 12 and 15). The foam protectors 82 may be of any appropriate shape or size, such as generally cylindrical. The foam protectors 82 may be located at any appropriate position on the bike rack 10. For example, the foam protectors 82 may be located on each support tube 60, whereby each foam protector 82 may be slidable along the length of the support tube 60. In addition, there may be any appropriate number of foam protectors 82. The foam protectors 82 may be utilized on the wings 60 to inhibit damage to the bikes 18 located thereon.

The bicycle or cargo item 18 may be secured to the bike rack 10 by any appropriate means, such as a strap, cable, rope, chain or the like 86, for maintaining the cargo item 18 on the bike rack 10. The bike rack 10 may incorporate many desired features, allow for pleasant aesthetics, and provide for a sturdy construction.

Figure 17:
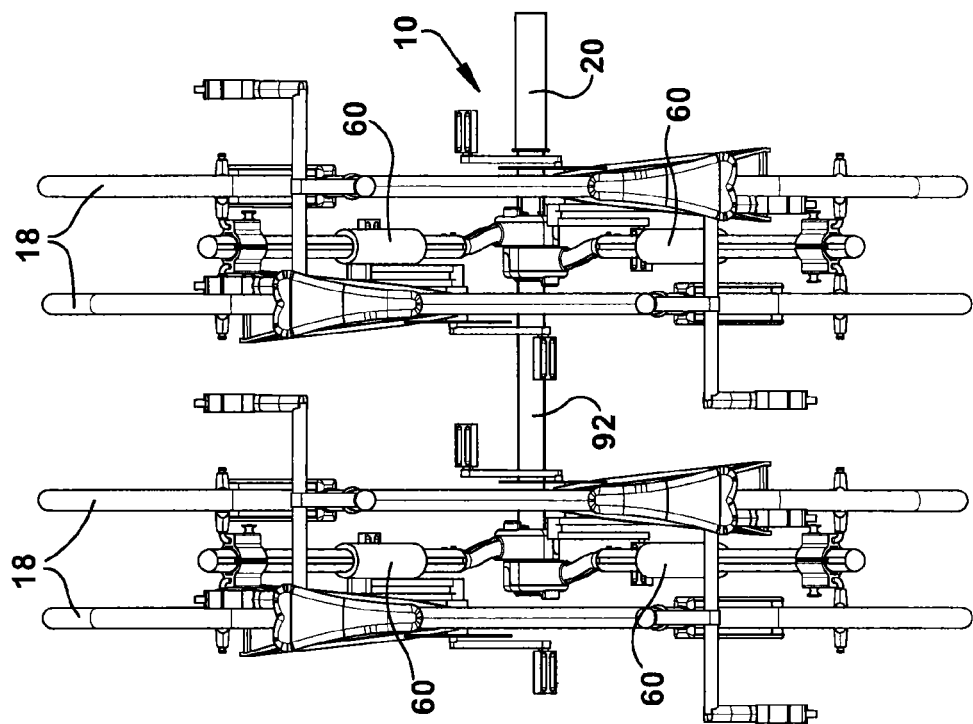
FIG. 17 illustrates a top view of the four bike layout having four wings of FIG. 16.
Figure 16:
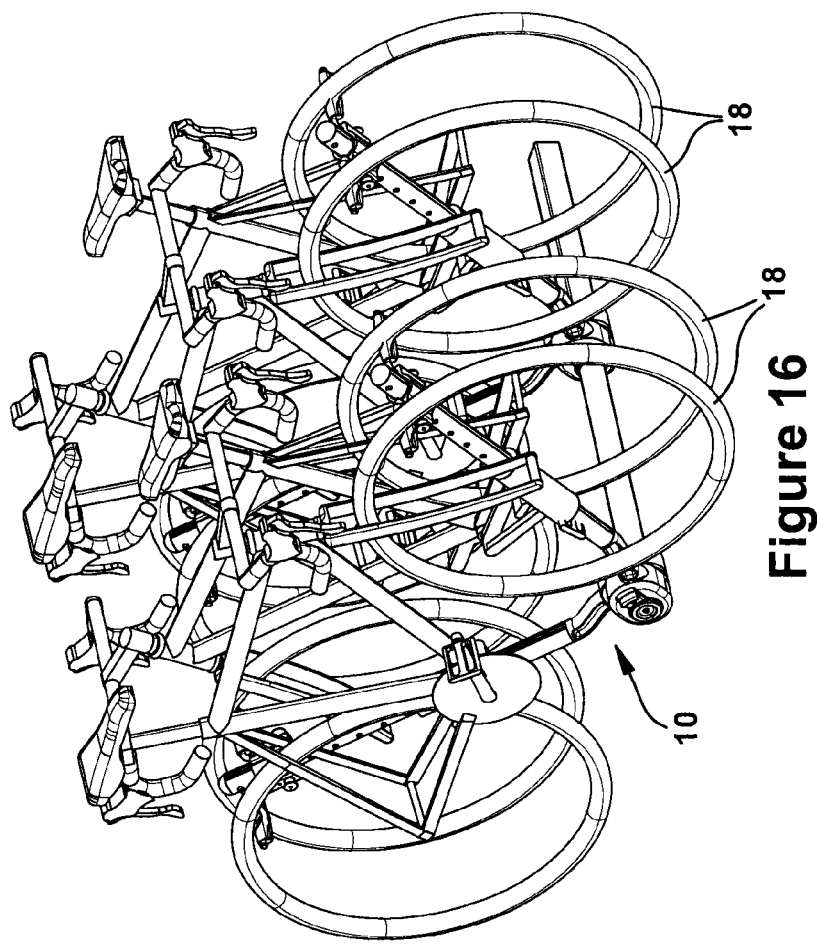
FIG. 16 illustrates a perspective view of the bike rack in a four bike layout having four wings.
Figure 19:
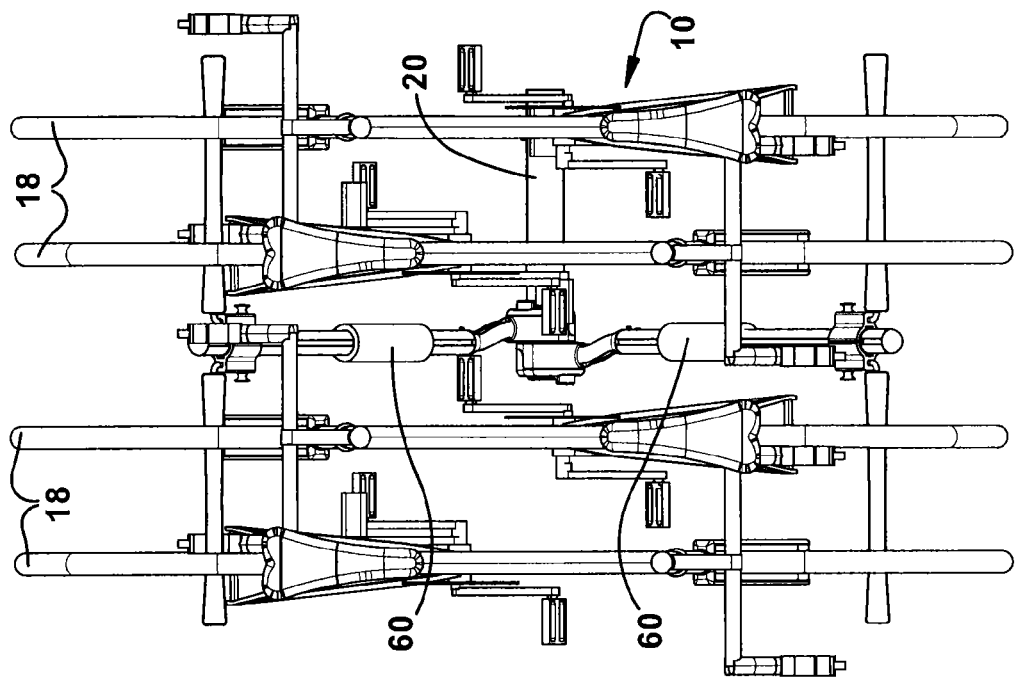
FIG. 19 illustrates a top view of the bike rack in a four bike layout having two wings of FIG. 18.
Figure 18:
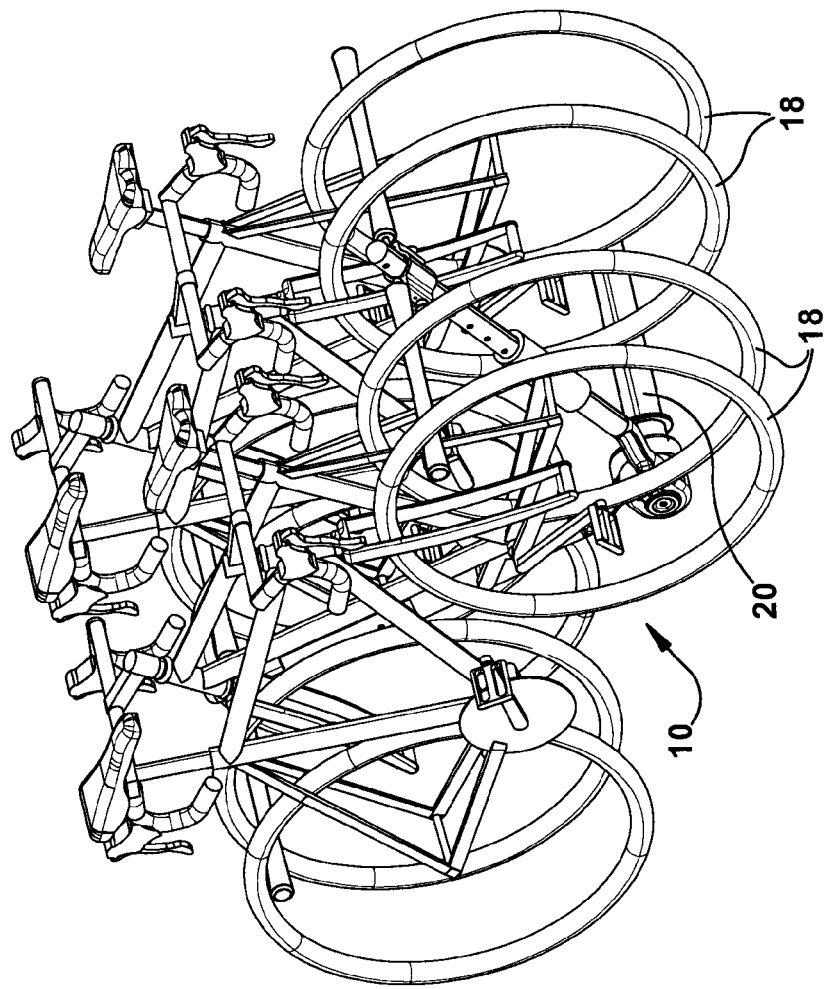
FIG. 18 illustrates a perspective view of the bike rack in a four bike layout having two wings.

The bike support members 74 that engage with and support the wheels of the bike 18 can be adjusted along the length of the wings 60. Two bike support members 74, extending in opposite directions, are moveably attached to each wing 60. As a result, each pair of wings 60 may support two bikes 18, one forward of the wings 60, such as between the wings 60 and the vehicle, and the other rearward of the wings 60 (FIGS. 16 and 17). In some embodiments, a single pair of wings 60 may support four bikes 18 (FIGS. 18 and 19).

In some embodiments, the bike rack 10 may be attached to a wall of a garage to store bikes in the garage. The adjustable wings 60 may facilitate the fitment of the bikes on the rack 10 and allow for a more compact rack 10 when not in use.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. A bike rack comprising:
    a hub assembly comprising a first hub and a second hub, said first and second hubs generally axially aligned at an axis, wherein each hub includes an elongated arm extending upward relative to the axis when in an operative position;
    a support wing assembly including a first wing and a second wing, wherein said first wing is selectively attached with said elongated arm of said first hub and said second wing is selectively attached with said elongated arm of said second hub;
    wherein said first and second hubs are rotatably adjustable; and
    a hitch insert assembly having a first end and a second end, wherein said first end is located within said hub assembly and said second end is engaged with a receiver hitch of a vehicle, said first hub and said second hub are rotatably adjusted about said first end of said hitch insert assembly.

2. The bike rack of claim 1, wherein said first end of said hitch insert assembly includes first and second sets of engaging members wherein said first set of engaging members are radially spaced around said first end at a first location.

3. The bike rack of claim 2, wherein said second set of engaging members are radially spaced around said first end at a second location.

4. The bike rack of claim 3, wherein said first hub is engageable with said first set of engaging members and said second hub is engageable with said second set of engaging members.

5. The bike rack of claim 3, wherein said elongated arms are insertable within said wings or said wings are insertable within said elongated arms.

6. The bike rack of claim 5, wherein said first wing is rotatably adjustable about said first set of engaging members and said second wing is rotatably adjustable about said second set of engaging members.

7. The bike rack of claim 6, wherein said wings are independently rotatably of each other.

8. The bike rack of claim 6, wherein said hubs each include a locking mechanism operable by an actuator.

9. The bike rack of claim 1, wherein said first and second hubs are rotatably adjustable to at least three positions.

10. The bike rack of claim 1, wherein said first and second hubs are rotatably adjustable to a plurality of operable positions.

11. A bike rack for securing at least one bicycle, said bike rack comprising:
    a hub assembly comprising a pair of hubs;
    at least one wing, wherein said at least one wing is engaged with one of said pair of hubs;
    a pair of cradles located on said at least one wing, wherein a first cradle of said pair of cradles is movable passes a second cradle of said pair of cradles;
    at least one bike support member located on each cradle; and
    an anti-sway finger located on said wing, wherein said anti-sway finger is engageable with the bicycle and the rack thereby providing three points of support for a bike secured to the rack.

12. The bike rack of claim 11, wherein said wings include a channel located on each side.

13. The bike rack of claim 12, wherein said cradles include a pair of slats that are slidable within said channels.

14. The bike rack of claim 11, wherein said wings include a plurality of apertures located on each side.

15. The bike rack of claim 14, wherein each cradle includes a spring loaded pin to engage said cradles with said wing apertures.

16. The bike rack of claim 11, wherein each hub includes an arm, whereby said at least one wing is engaged with one of said arm.

17. The bike rack of claim 11, wherein each of said cradles is moveable independently of one another along said wing.

18. A bike rack for securing at least one bicycle to a vehicle, said bike rack comprising:
    a hub assembly comprising a pair of hubs;
    at least one wing associated with each hub;
    a cradle selectively securable to said at least one wing, said cradle including at least one bike support member;
    an integral locking member located adjacent said hub assembly, said locking member comprises at least one ring configured accept a locking device to secure a bike to said locking member, wherein said at least one ring is selectively secured to said at least one wing; and
    a hitch insert assembly having first and second ends, wherein said first end is located within said hub assembly and said second end is engageable with a receiver hitch of a vehicle, said pair of hubs are rotatably adjustable about said first end of said hitch insert assembly.

19. The bike rack of claim 18, wherein said at least one ring includes at least one annular ring.

20. The bike rack of claim 18, wherein each hub includes an arm to which said wing is attached and said locking member is integrally formed with said arms.

21. The bike rack of claim 18, wherein said locking member is integrally formed with a hitch receiver of the vehicle.

22. A bike rack for securing at least one bicycle to a vehicle, said bike rack comprising:
    a hub assembly comprising:
        a pair of hubs generally axially aligned and rotatably adjustable;
        a locking device integrally formed with said hub assembly, wherein said locking device locks said pair of hubs relative to one another;
    a wing associated with each hub; and
    a cradle positionably engaged with each of said wings; and a plurality of apertures located on each side of said wings, wherein each cradle includes a spring loaded pin to engage said cradles with said apertures.

23. The bike rack of claim 22, further comprising a slot located within said wings, said cradle being slidably adjustable along said slot.

24. The bike rack of claim 23, further comprising a-second cradle positionably engaged with at least one of said wings, wherein at least one of said cradles is movable independent of said second cradle.

25. The bike rack of claim 24, wherein said at least one of said cradles is configured to slide past said second cradle along said at least one of said wings.

* * * * *